United States Patent

[11] 3,576,466

| [72] | Inventor | William C. Griffin<br>Ridgecrest, Calif. |
|---|---|---|
| [21] | Appl. No. | 773,170 |
| [22] | Filed | Nov. 4, 1968 |
| [45] | Patented | Apr. 27, 1971 |
| [73] | Assignee | The United States of America as represented by the Secretary of the Navy |

[54] HIGH INTENSITY MERCURY-LINE SOURCE
2 Claims, 3 Drawing Figs.

[52] U.S. Cl. .................................................. 315/137,
315/142, 315/206
[51] Int. Cl. ..................................................... H05b 41/38,
H05l 41/234
[50] Field of Search ........................................... 315/137,
139, 141, 142

[56] References Cited
UNITED STATES PATENTS

| 751,016 | 2/1904 | Rogers | 315/137X |
| 2,122,436 | 7/1938 | Pirani et al. | 315/141X |
| 3,222,573 | 12/1965 | Lord | 315/125X |
| 3,227,920 | 1/1966 | Peek et al. | 315/125X |
| 3,339,107 | 8/1967 | Aldenhoff | 315/141 |

FOREIGN PATENTS

| 1,069,780 | 11/1959 | Germany | 315/139 |

Primary Examiner—Robert Segal
Attorneys—Edgar J. Brower, Roy Miller and Gerald F. Baker ABSTRACT: The invention utilizes a tubular mercury vapor lamp for high intensity backlighting for use with the ballistic-synchro camera technique. In order to effectively eliminate the flicker inherent in such lamps because of the alternating current supply, three-phase power is used with three ballasts and three full-wave bridge rectifiers, with the outputs of the rectifiers in parallel. Although with continual application of this power the lamp is overloaded, satisfactory control is achieved by operating the lamp on single phase for standby and switching on the other two phases just prior to event time and switching back to single phase when the object to be photographed has cleared the area.

Patented April 27, 1971

3,576,466

*INVENTOR.*
WILLIAM C. GRIFFIN

*BY* ROY MILLER
ATTORNEY.
GERALD F. BAKER
AGENT.

HIGH INTENSITY MERCURY-LINE SOURCE

GOVERNMENT INTEREST

The invention described herein may be manufactured and used by or for the Government of the United States of America for governmental purposes without the payment of any royalties thereon or therefor.

BACKGROUND OF THE INVENTION

In the photography of machine gun projectiles, such as the 20 mm., various types and combinations of high-speed cameras are utilized. To obtain high quality data, well defined images are necessary. A short exposure time is required to effectively "stop" the motion of the image, or the image motion must be synchronized with the recording medium to provide a longer exposure time. In either event, with normal sunlight conditions, large lens stops are required for adequate exposure. However, the large lens stops provide only a shallow depth of field. Should the projectile veer from the predicted trajectory, fuzzy images are sure to be the result. Therefore, small lens stops, which provide a greater depth of field, should be used.

In order to effectively use small lens stops to insure obtaining the quality of data required, it is necessary to be able to adjust and enhance lighting conditions. To this end, artificial high intensity lighting methods have been devised to supplement ambient sunlight conditions which are, of course, subject to a great amount of variation.

The ballistic-synchro type of camera is made in several forms, all of which achieve the prime objective of synchronizing the motion of the film with the motion of the image, or moving a mirror or prism to lay down an image on stationary film in order to show no motion. The stationary film technique is generally used only for explosives studies and is not considered here since this investigation centers around relatively low velocities.

The synchro cameras in use generally consist of three basic parts: a lens, a slit, and a device for moving film at various velocities to synchronize with the image velocity.

The opening in the slit and the velocity of the film are the major factors that govern the time of the exposure. If the image velocity and the film velocity are precisely synchronized, it might be possible to obtain a long exposure time (such as 100 microseconds, or more) that would show no image motion. In such an event, daylight would be entirely adequate. However, in the present state-of-the-art, precise synchronization is not usually obtainable, and a narrow slit must be used to reduce the image blur caused by the velocity mismatch. When a sufficiently short exposure time is employed and there is mismatch, no blur will be apparent, but, depending on whether the film velocity is higher or lower than the image velocity, elongation or compression of the image will take place.

As is the case of framing cameras, depth of field is a problem when there is dispersion, hence, small lens stops should be used. In general, the time of exposure will be greater with a synchro camera than it will be with a framer, but the synchro will be fitted with a longer focal length lens and will be set at a smaller $f$ stop. Again, higher than sunlight light levels are indicated.

To obtain quality photographs with the ballistic-synchro camera technique, illumination of moderately high level is required. The synchronization of the image and film velocities will provide additional exposure if wide aperture slits are utilized. However, in general, it is not practical to plan on perfect synchronization, even when drum type cameras are employed, because of the unpredictability of object velocity variations.

The ballistic synchro camera "sees" only a very narrow line in the object plane. This line is the optical projection of the slit aperture adjacent to the focal plane, and no exposure from areas wider than this "virtual image" will be made. With this in mind, only the area of the virtual image needs to be illuminated. If reflected-light photographs are to be made of an object in this plane, the level of illumination will be governed by (1) the reflectivity of object, as well as by the velocity of the film, (2) the camera slit aperture, and (3) the $f$ stop of the lens.

If shadowgraphs are to be made, the reflectivity of the object can be neglected, and the exposure can be made for the level of the backlight only. This makes possible very short exposure times and takes advantage of the depth-of-field benefit gained by the use of small lens apertures.

Investigation of the General Electric high-bay tubular mercury vapor lamp, type H3000A9, seemed to be a very likely place to start in devising an effective high-intensity backlight. This lamp is designed for use with alternating current provided through a special ballast. When so operated, there is some flicker due to the AC. Although this flicker can be reduced by first applying the output of the ballast to a full-wave bridge rectifier and then to the lamp, there remains a small null, and the "on" cycle for photographic exposure becomes about 70 percent.

SUMMARY OF THE INVENTION

By this invention improvements have been made that essentially eliminate the flicker. While conventional filter techniques do not seem compatible with this lamp (possibly due to its negative resistance characteristic), a system using three-phase power with three ballasts and three full-wave bridge rectifiers, with the outputs of the rectifiers paralleled, has proved to be very satisfactory in maintaining a steady light. This system also gives the added bonus of 2 $f$ stops because of the greater power available to the lamp. FIGS. 2 and 3 illustrate the wave shape provided by single-phase power (FIG. 2) as compared with the three-phase power (FIG. 3). With continual application of this power the lamp is overloaded, but this can be controlled by operating on single phase for standby, then switching on the other two phases (120° apart) just prior to event time and switching them off again when the object to be photographed has cleared the area.

DESCRIPTION AND OPERATION

Figure 1:
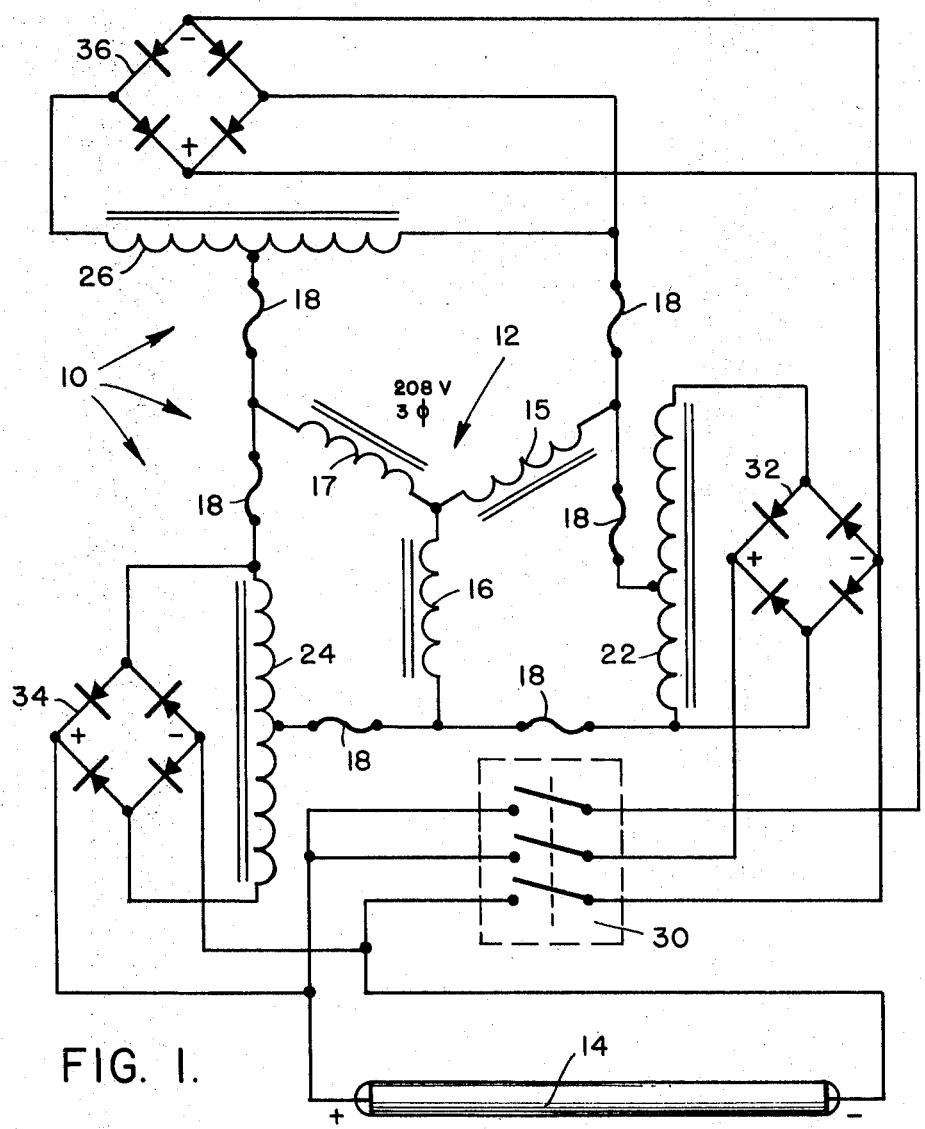
FIG. 1 is a schematic of a lighting system according to the invention.

As shown in FIG. 1 the system 10 comprises a source of three-phase current 12 giving an output of 208 volts from each of elements 15, 16 and 17, respectively, ballast elements 22, 24, 26 through fuzes 18. Connected across the respective elements 22, 24, 26 are the full-wave rectifier bridges 32, 34, 36.

The ballast elements may be obtained commercially and those used in the disclosed construction were essentially Electric Corporation No. A2011 MB 3AD1 lamp ballasts comprising an autotransformer with an accompanying reactance and capacitance. The reactors or chokes have been omitted for the sake of simplicity and the capacitors were replaced by the rectifier bridge in the construction shown.

A mercury vapor lamp 14 is connected directly across rectifier bridge 34 and through switch 30 to rectifier bridges 32 and 36.

Figure 2:
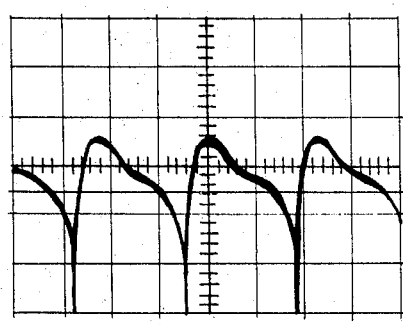
FIG. 2 is a graph representing the oscilloscope trace representing current flowing from a single phase source.

So long as power is supplied to the system, current will be conducted to lamp 14 essentially in the waveform shown in FIG. 2. Although the light available from the lamp under these circumstances is entirely suitable for some purposes, it may be seen that current drops well below that necessary for useable light at intervals causing a definite flicker which greatly detracts from its usefulness under the conditions stated above.

According to the invention therefore three-phase current is supplied to the lamp 14 when switch 30 is closed. As is well known in the art, the switch 30 may be closed in synchronism with the event and three-phase current is supplied through the lamp for a duration generally of only a few seconds.

Figure 3:
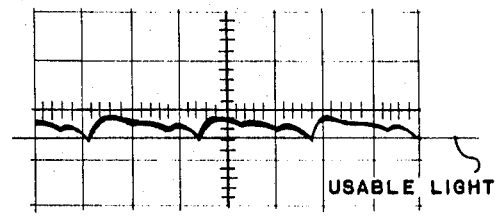
FIG. 3 is a graph representing an oscilloscope trace of the current flowing in a three-phase system.

During the operation of lamp 14 on three-phase current, the current flowing through the system is in the form represented by the oscilloscope trace in FIG. 3 wherein it may be seen that flicker is almost entirely eliminated.

Utilizing an illumination system according to the present invention backlighting technique (shadowgraph or Schlieren) has produced much useful information, including shock wave investigation.

I claim:

1. Illuminating means comprising: a source of power having three current phases; a first ballast having a first terminal connected to a first of said current phases and a first diagonal of a full-wave rectifier, an intermediate portion connected to the second of said current phases, and a second terminal connected to said full-wave rectifier opposite to said first terminal; a second ballast having a first terminal connected to the second of said current phases and a first diagonal of a second full-wave rectifier, an intermediate portion connected to the third of said current phases, and a second terminal connected to said second full-wave rectifier opposite to said first terminal; a third ballast having a first terminal connected to the third of said current phases and a first diagonal of a third full-wave rectifier, an intermediate portion connected to the first of said current phases, and a second terminal connected to said third full-wave rectifier opposite to said first terminal; an illuminating device connected across the second diagonal of said full-wave rectifier; switch means for connecting in its closed position similarly poled ends of said second diagonals of said second and third rectifiers to said similarly poled end of said second diagonal of said full-wave rectifier, and for separately connecting opposite ends of said second diagonals to said opposite end of said second diagonal of said full-wave rectifier, whereby said illuminating device may be selectively operated in an overload condition on all three current phases.

2. An illuminating means as in claim 1 wherein said illuminating device is a mercury vapor lamp having a single-phase power rating and is operated at said power rating with said switch means in open position, and is operated above said power rating with said switch means in closed position for maximum light output, and substantially without flicker.